United States Patent [19]
Fisher

[11] Patent Number: 5,333,766
[45] Date of Patent: Aug. 2, 1994

[54] SWING LOCK SPARE TIRE CARRIER

[76] Inventor: Jerald Fisher, 5551 N. Sabel Dr., Milton, Wis. 53563

[21] Appl. No.: 58,142

[22] Filed: May 10, 1993

[51] Int. Cl.⁵ .................................... B62D 43/02
[52] U.S. Cl. ......................... 224/42.21; 414/465; 296/37.2; 224/42.25; 224/42.28; 224/42.29
[58] Field of Search ............... 224/282, 42.06, 42.12, 224/42.21, 42.25, 42.26–42.3; 296/37.2; 414/465, 463, 464

[56] References Cited

U.S. PATENT DOCUMENTS

| | | | |
|---|---|---|---|
| 3,845,891 | 11/1974 | Becher | 414/465 X |
| 4,042,157 | 8/1977 | Weiler | 224/42.21 |
| 4,434,919 | 3/1984 | Flowers | 224/42.21 |
| 4,718,582 | 1/1988 | Iovenitti | 224/42.21 |
| 4,817,834 | 4/1989 | Weiler | 224/42.21 X |
| 4,869,409 | 9/1989 | Wright | 224/42.21 |
| 4,946,084 | 8/1990 | Britto | 224/42.21 |
| 5,020,707 | 6/1991 | Nozel et al. | 224/42.21 |
| 5,094,374 | 3/1992 | Lee | 224/42.21 |
| 5,186,371 | 2/1993 | Jozefczak et al. | 224/42.21 |

FOREIGN PATENT DOCUMENTS

| | | | |
|---|---|---|---|
| 0274674 | 11/1990 | Japan | 224/42.21 |
| 1079525 | 3/1984 | U.S.S.R. | 224/42.21 |

Primary Examiner—Ernest G. Cusick
Attorney, Agent, or Firm—E. Michael Combs

[57] ABSTRACT

An apparatus for mounting a spare tire includes a plurality of hinge plates arranged in a parallel spaced coextensive relationship hingedly mounted to the door hinges of an associated vehicular van door, wherein the hinge plates mount a support bar in an orthogonal relationship, and the support bar includes a pivotal carrier structure arranged for displacement relative to the van door to permit complete opening of the van door in use.

4 Claims, 4 Drawing Sheets

SWING LOCK SPARE TIRE CARRIER

BACKGROUND OF THE INVENTION

1. Field of the Invention

The field of invention relates to spare tire mounting structure, and more particularly pertains to a new and improved swing lock spare tire carrier wherein the same is arranged for displacement relative to a rear door of an associated van and the like to permit complete opening of the van door.

2. Description of the Prior Art

Spare tire carriers of various types are utilized throughout the prior art as indicated in U.S. Pat. Nos. 4,946,084; 4,718,582; 4,869,409; 5,020,707; and 4,834,273.

The instant invention attempts to overcome deficiencies of the prior art by providing for a compact pivotally mounted structure mounted to the hinge portions of a van door to permit displacement relative to the van door for ease of opening the van door in a complete arc relative to the van rear opening and in this respect, the present invention substantially fulfills this need.

SUMMARY OF THE INVENTION

In view of the foregoing disadvantages inherent in the known types of spare tire carrier apparatus now present in the prior art, the present invention provides a swing lock spare tire carrier wherein the same includes a spare tire carrier bracket structure arranged for pivotal displacement relative to the rear surface of a van door to permit the van door complete opening. As such, the general purpose of the present invention, which will be described subsequently in greater detail, is to provide a new and improved swing lock spare tire carrier which has all the advantages of the prior art spare tire carrier apparatus and none of the disadvantages.

To attain this, the present invention provides an apparatus for mounting a spare tire including a plurality of hinge plates arranged in a parallel spaced coextensive relationship hingedly mounted to the door hinges of an associated vehicular van door, wherein the hinge plates mount a support bar in an orthogonal relationship, and the support bar includes a pivotal carrier structure arranged for displacement relative to the van door to permit complete opening of the van door in use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved swing lock spare tire carrier which has all the advantages of the prior art spare tire carrier apparatus and none of the disadvantages.

It is another object of the present invention to provide a new and improved swing lock spare tire carrier which may be easily and efficiently manufactured and marketed.

It is a further object of the present invention to provide a new and improved swing lock spare tire carrier which is of a durable and reliable construction.

An even further object of the present invention is to provide a new and improved swing lock spare tire carrier which is susceptible of a low cost of manufacture with regard to both materials and labor, and which accordingly is then susceptible of low prices of sale to the consuming public, thereby making such swing lock spare tire carriers economically available to the buying public.

Still yet another object of the present invention is to provide a new and improved swing lock spare tire carrier which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
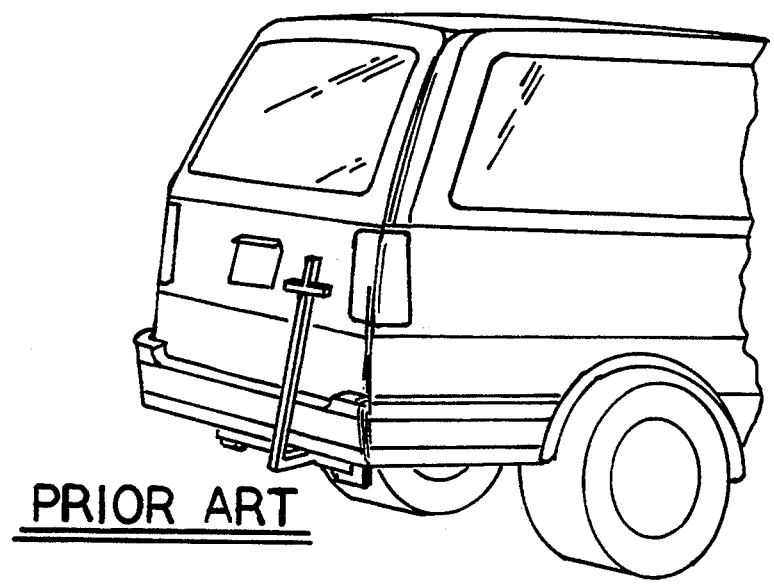
FIG. 1 is an isometric view of a spare tire carrier structure as indicated in U.S. Pat. No. 4,946,084, wherein the carrier structure is pivotally mounted relative to the bumper portion for displacement permitting opening of the rear door portion.
Figure 2:
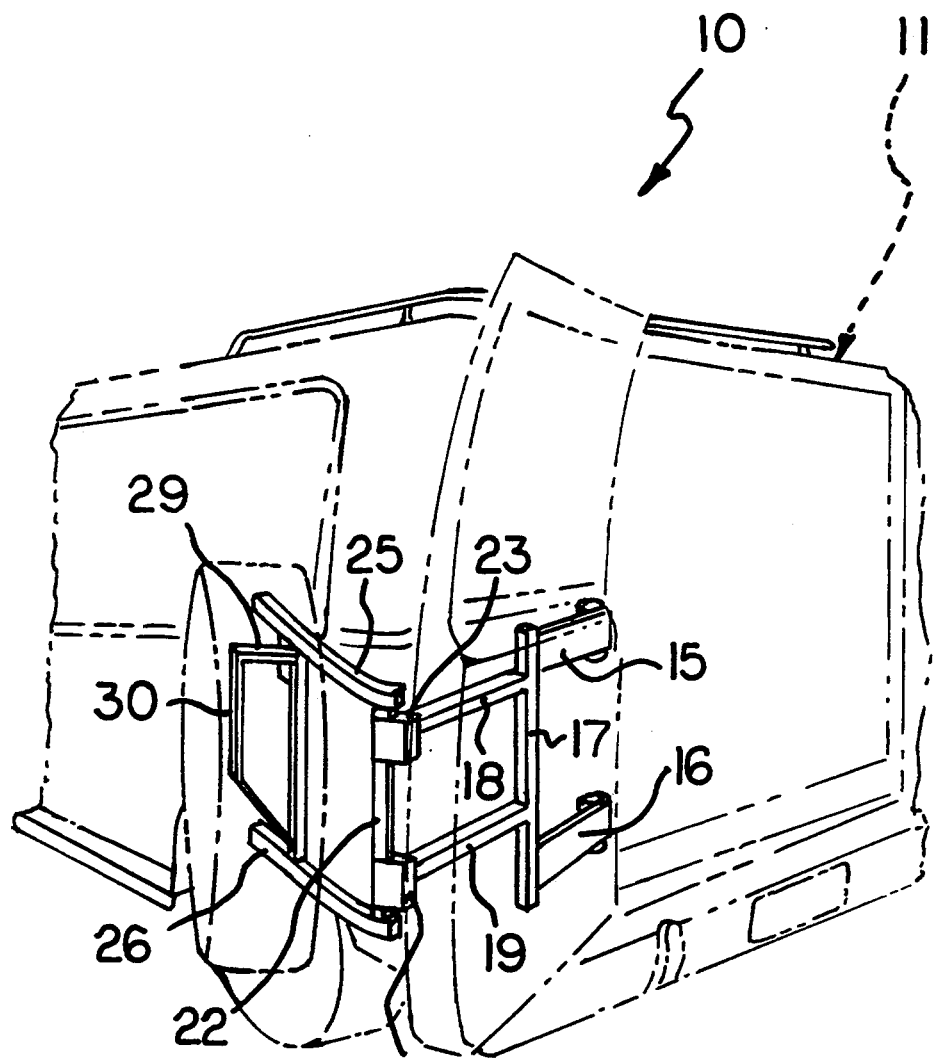
FIG. 2 is an isometric view of the invention in an opened configuration.

With reference now to the drawings, and in particular to FIGS. 2 to 7 thereof, a new and improved swing lock spare tire carrier embodying the principles and concepts of the present invention and generally designated by the reference numeral 10 will be described.

Figure 3:
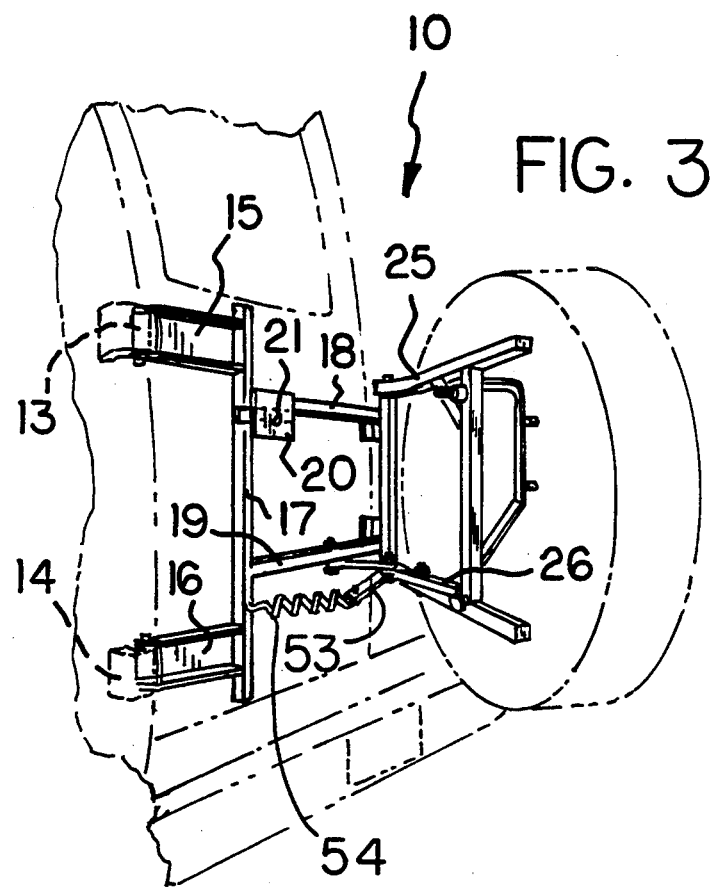
FIG. 3 is a further view of the invention in a partially opened configuration.
Figure 5:
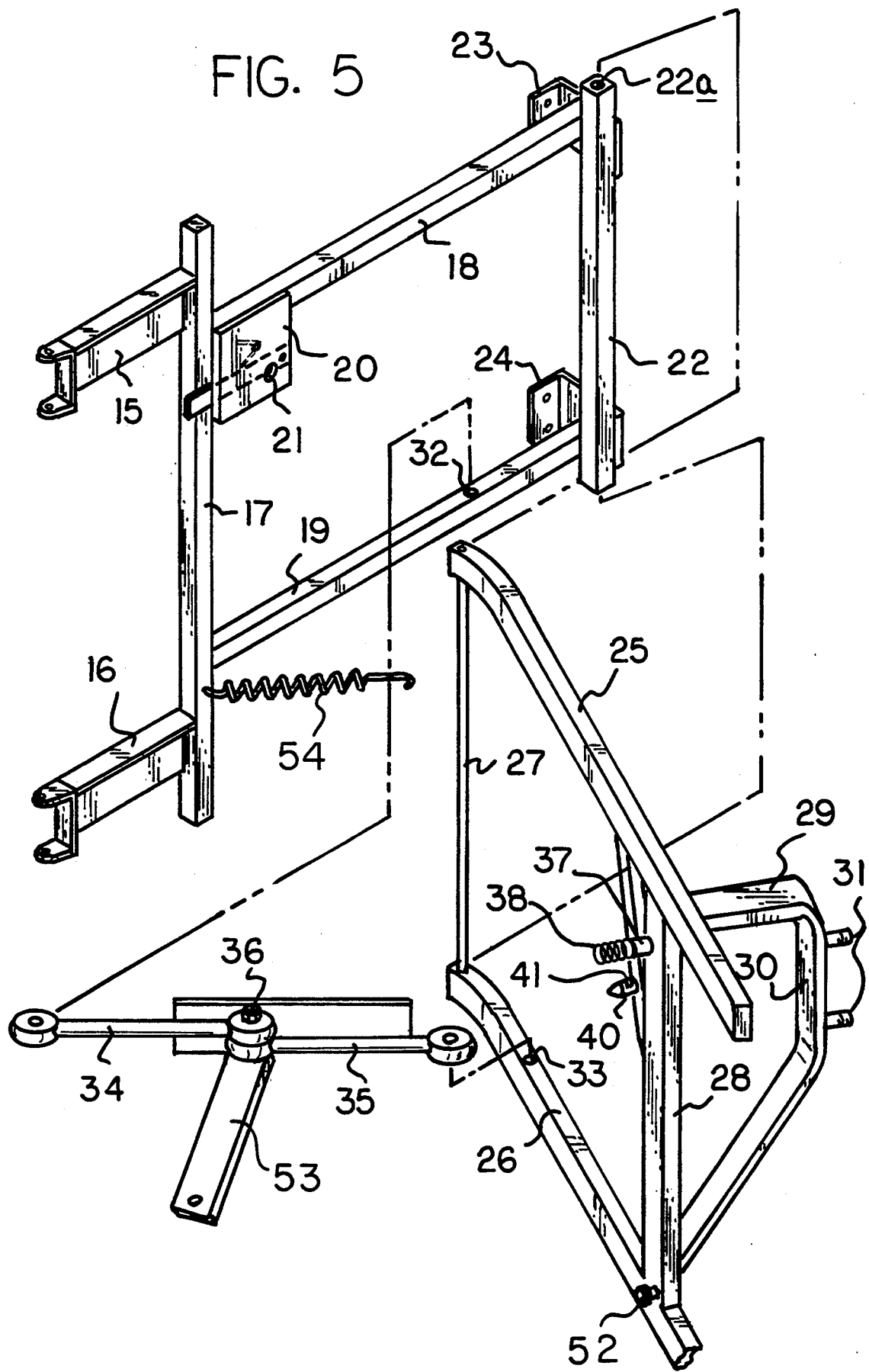
FIG. 5 is an isometric exploded view of the invention.
Figure 6:
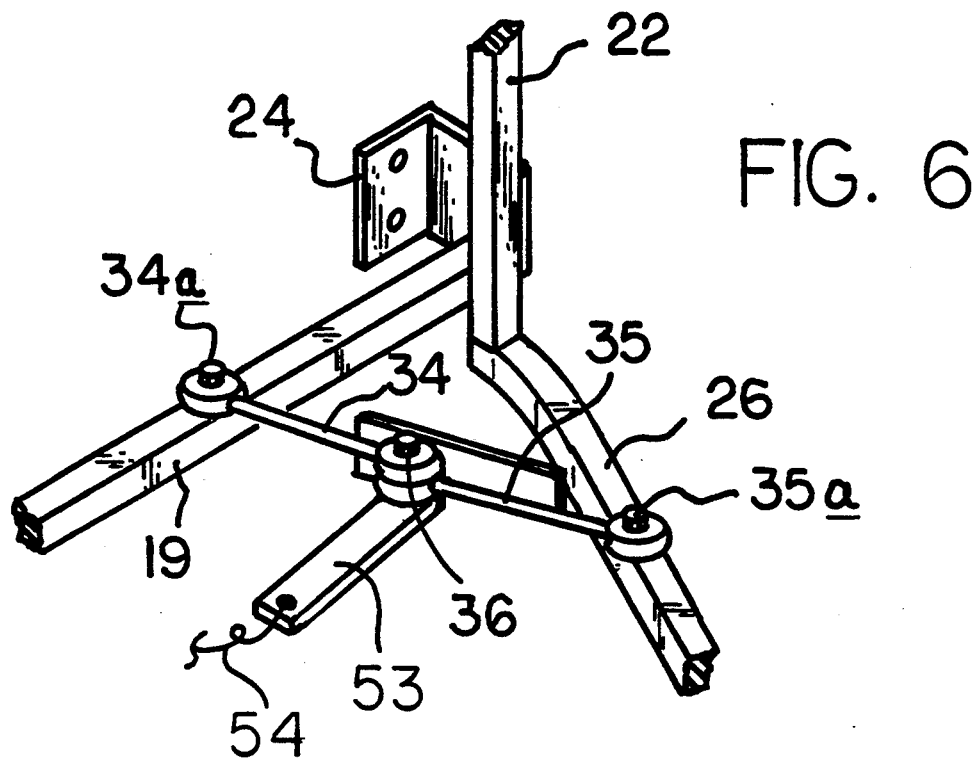
FIG. 6 is an enlarged isometric view of the bracket structure arranged for pivoting relative to the van door support leg portions.
Figure 7:
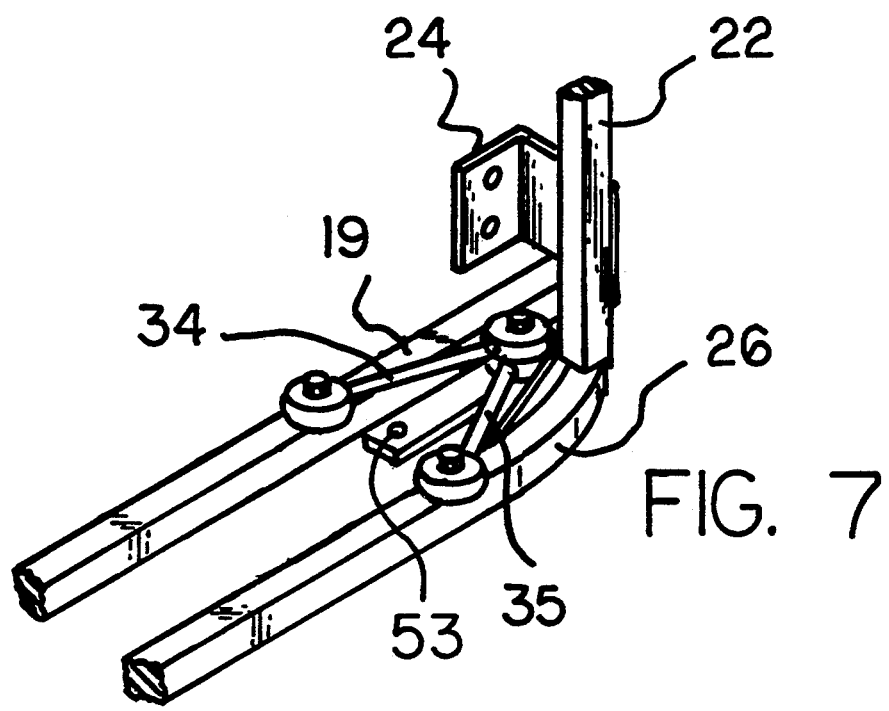
FIG. 7 is an isometric view of the bracket structure arranged in a closed orientation relative to the van door leg portions.

More specifically, the swing lock spare tire carrier 10 of the instant invention essentially comprises the apparatus mounted to a vehicular van 11, and more specifically to an exterior surface of the van door 12, as the van door 12 is pivotally mounted to the van 11 about respective first and second hinges 13 and 14. A first hinge plate 15 is pivotally mounted to the first hinge 13, while a second hinge plate 16 is mounted to the second hinge 14. The first and second hinge plates 15 and 16 are arranged in a parallel coextensive relationship relative to one another, and include a first support bar 17 fixedly and orthogonally mounted to the first and second hinge plates 15 and 16 in a spaced relationship relative to the first and second hinges 13 and 14. First and second legs 18 and 19 are fixedly and orthogonally mounted to the first support bar 17 parallel to and extending beyond the first and second hinge plates 15 and 16. A latch plate 20 is mounted to the first leg 18 at its intersection with the first support bar 17, with the latch plate 20 having a latch plate aperture 21 directed therethrough. A second support bar 22 is fixedly and orthogonally mounted to the first and second legs 18 and 19, with the second support bar 22 parallel and spaced relative to the first support bar 17. The second support bar includes first and second L-shaped mounting plates 23 and 24 fixedly mounted to the second support bar 22, with the first and second mounting plates 23 and 24 arranged for mounting to the van door 12 in a spaced relationship relative to the first and second hinges 13 and 14. A second support bar bore 22a is directed coextensively and coaxially of the second support bar 22, with the support bar bore 22a arranged to receive an axle 27 therethrough, with the axle 27 mounted intermediate and orthogonally to first ends of respective first and second mounting bars 25 and 26 that are in turn in a parallel coextensive relationship relative to one another. A cross bar 28 is mounted between the first and second mounting bars 25 and 26, with the cross bar 28 parallel to and spaced relative to the axle 27. A mounting bracket 29 is mounted to a first side of the cross bar 28, with the mounting bracket 29 having a support plate 30 parallel to and spaced from the cross bar 28. Cross bar reinforcing bar 28 extends fixedly from cross bar 28 to the first mounting bar 25. The support plate 30 includes a plurality of threaded lugs 31 fixedly and orthogonally mounted to the support plate 30 to receive a tire member thereon, in a manner as indicated in FIG. 3. First hinge bore 32 is directed through the second leg 19 in adjacency to the second support bar 22, while a second hinge bore 33 is directed through the second mounting bar 26 in adjacency to the axle 27, wherein a first link 34 is pivotally mounted to the first leg 18 by a first link axle 34a. The second link 35 is pivotally mounted to the second mounting bar 26 about a second link axle 35a directed through the second hinge bore 33. A pivot knuckle 36 pivotally mounts the first and second links 34 and 35 together spaced from the first and second link axles 34a and 35a, in a manner as indicated in FIGS. 5-7 for example.

A pivot plate 53 is provided, having its rearward end pivotally mounted about the buckle 36, with its forward end secured to a pivot plate spring 54, that in turn is secured to the second leg 19 to bias the first and second mounting bars 25 and 26 in a displaced orientation relative to the vehicle, in a manner as indicated in FIG. 3.

A spring socket 37 mounts a biasing spring 38 therewithin, with the biasing spring and spring socket mounted to a second side of the cross bar 28, with the biasing spring 38 arranged for abutment onto the latch plate 20 in adjacency to and spaced from the latch plate aperture 21. A latch leg 40 mounted to reinforcing bar 28a parallel to the biasing spring 38 includes a latch leg notch 41 arranged to receive the latch plate aperture 21 within the notch, as the link projects through the notch and is arranged to abut the notch by a latch leg bevel 34 extending from the notch 41 to a free distal end of the latch leg 40.

Figure 4:
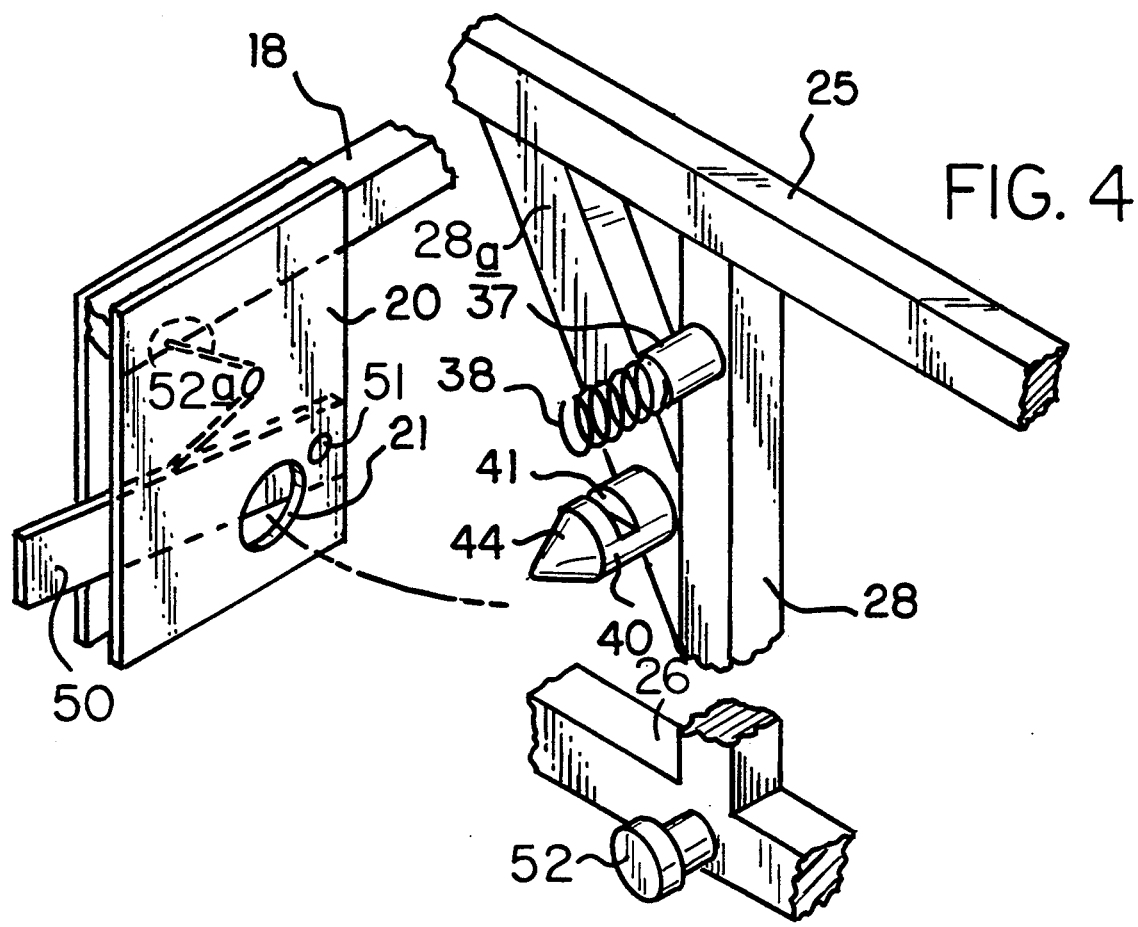
FIG. 4 is an enlarged orthographic view of the lock structure of the invention.

Reference to FIG. 4 illustrates the use of a latch bar 50 pivotally mounted about a latch bar pivot axle 51 to the plate 20, with a latch bar spring 52a interposed between the first leg 18 and the latch bar 50 to bias the latch bar over the plate aperture 21 for engagement with the notch 41. As understood, upon lifting of the latch bar 50, disengagement relative to the latch is provided to permit displacement of the bars 25 and 26 about the axle 27. A bumper pad 52 mounted to the second mounting bar 26 is arranged to provide for abutment with a rear door portion of the vehicle preventing marring of the vehicle surface.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A swing lock spare tire carrier arranged for mounting to a vehicular van, wherein the vehicular van includes a van door, and the vehicular van includes a first hinge and a second hinge pivotally mounting the van door, and wherein the apparatus comprises, a first hinge plate and a second hinge plate arranged in a parallel coextensive relationship relative to one another, with the first hinge plate arranged for securement to the first hinge, and the second hinge plate arranged for securement to the second hinge, and a first support bar fixedly and orthogonally mounted to the first hinge plate and the second hinge plate, with the first hinge plate pivotally mounted to the first hinge at a first hinge plate first end, and the second hinge plate pivotally mounted to the second hinge at a second hinge plate first end, and a first hinge plate second end and a second hinge plate second end are fixedly mounted to the first support bar, and a first leg and a second leg, the first leg having a first leg first end and the second leg having a second leg first end, with the first leg first end and the second leg first end fixedly mounted to the first support bar in an orthogonal relationship, with the first leg and the second leg parallel to the first hinge plate and the second hinge plate, and a second support bar fixedly and orthogonally mounted to the first leg and the second leg spaced from the first support bar, and a first mounting plate and a second mounting plate fixedly mounted to the second support bar arranged for abutment with the van door, and the first support bar and the second support bar are orthogonally oriented relative to the first leg and the second leg, and bracket means pivotally mounted to the second support bar for support of a tire member thereon.

2. An apparatus as set forth in claim 1 wherein the bracket means includes the first mounting bar and the second mounting bar oriented in a spaced parallel and coextensive relationship relative to one another, and the first mounting bar having a first mounting bar first end and a first mounting bar second end, and the second mounting bar having a second mounting bar first end and a second mounting bar second end, with a support bar axle orthogonally oriented between the first mounting bar and the second mounting bar extending between the first mounting bar first end and the second mounting bar first end, and the second support bar having a support bar bore coaxially directed coextensively of the second support bar, and the support bar axle rotatably received through the second support bar bore, and a cross bar fixedly and orthogonally oriented between the first mounting bar and the second mounting bar spaced from and parallel the support bar axle, wherein the cross bar includes a mounting bracket extending beyond the cross bar to a first side of the cross bar, with the mounting bracket having a support plate oriented parallel to and spaced from the cross bar, with the support plate having a plurality of lug members for receiving a tire member thereon, and a spring socket fixedly and orthogonally mounted to the cross bar to a second side of the cross bar, and the spring socket having a biasing spring projecting beyond the spring socket, and a latch leg fixedly mounted in adjacency to the cross bar spaced from the spring socket, and the latch leg having a latch leg first end and a latch leg second end, the latch leg first end including a latch leg beveled portion and a notch, with the notch oriented in adjacency to the latch leg beveled portion, and a latch plate fixedly and orthogonally mounted to the first leg in adjacency to the first support bar, wherein the latch plate includes a latch plate aperture arranged to receive the latch leg notch therewithin.

3. An apparatus as set forth in claim 2 wherein the latch plate includes a latch bar pivotally mounted to the latch plate about a pivot axle, with the latch bar arranged for extending over the aperture for reception within the notch.

4. An apparatus as set forth in claim 3 including a latch bar spring mounted to the latch bar for biasing the latch bar over the aperture.

* * * * *